United States Patent
Bishop et al.

(10) Patent No.: US 6,852,770 B2
(45) Date of Patent: Feb. 8, 2005

(54) RADIATION-CURABLE COMPOSITION AND PRODUCTS COATED THEREWITH

(75) Inventors: Timothy E. Bishop, Algonquin, IL (US); Jibing Lin, St. Charles, IL (US); David Krumin, Charlotte, NC (US); Lindsay S. Coons, Huntersville, NC (US); Paulus F. A. Buijsen, Herkenbosch (NL)

(73) Assignee: DSM IP Assets, B.V., Heerlen (NL)

( * ) Notice: Subject to any disclaimer, the term of this patent is extended or adjusted under 35 U.S.C. 154(b) by 39 days.

(21) Appl. No.: 10/042,284

(22) Filed: Jan. 11, 2002

(65) Prior Publication Data

US 2003/0018122 A1 Jan. 23, 2003

Related U.S. Application Data

(60) Provisional application No. 60/260,917, filed on Jan. 12, 2001, and provisional application No. 60/265,321, filed on Feb. 1, 2001.

(51) Int. Cl.[7] ................................................ C08F 2/46
(52) U.S. Cl. .......................... 522/96; 522/91; 522/97; 522/77; 522/74; 522/90; 522/173; 522/174; 522/179; 522/182; 522/178
(58) Field of Search ......................... 522/96, 91, 97, 522/77, 74, 90, 173, 174, 178, 179, 182

(56) References Cited

U.S. PATENT DOCUMENTS

| | | | | | |
|---|---|---|---|---|---|
| 5,907,023 | A | * | 5/1999 | Chawla | 528/49 |
| 5,977,202 | A | * | 11/1999 | Chawla et al. | 522/172 |
| 6,110,593 | A | * | 8/2000 | Szum et al. | 428/383 |
| 6,169,126 | B1 | * | 1/2001 | Szum et al. | 522/160 |
| 6,323,255 | B1 | * | 11/2001 | Snowwhite | 522/120 |
| 6,470,128 | B1 | * | 10/2002 | Khudyakov et al. | 385/128 |

FOREIGN PATENT DOCUMENTS

| | | | | |
|---|---|---|---|---|
| EP | 345968 A2 | * | 12/1989 | C03C/25/02 |
| WO | 99/08975 | | 2/1999 | |
| WO | WO 9952958 A1 | * | 10/1999 | B25H/5/00 |
| WO | 00/18696 | | 4/2000 | |

* cited by examiner

Primary Examiner—James J. Seidleck
Assistant Examiner—Sanza L. McClendon
(74) Attorney, Agent, or Firm—Mayer, Brown, Rowe & Maw LLP

(57) ABSTRACT

The present invention provides radiation-curable compositions and products coated therewith, such as coated optical fibers. The present compositions have a low amount of, or are even absent of, reactive diluents while still exhibiting a sufficiently low viscosity to be useful in a wide variety of coating applications, such as in processes for coating optical fibers.

19 Claims, No Drawings

RADIATION-CURABLE COMPOSITION AND PRODUCTS COATED THEREWITH

This application claims the benefit of U.S. Provisional Application Nos. 60/260,917, filed Jan. 12, 2001 and 60/265,321 filed Feb. 1, 2001. Both of the provisional applications are hereby incorporated in their entirety by reference.

FIELD OF THE INVENTION

The present invention relates to radiation-curable compositions. The invention further relates to products coated with these compositions.

BACKGROUND OF THE INVENTION

Radiation-curable compositions have been used to provide coatings for optical fibers. Optical fibers are generally coated with two superposed radiation-cured coatings, which together form a primary coating. The coating which is in direct contact with the glass is called the inner primary coating and the overlaying coating(s) is called the outer primary coating.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating(s), which is on the exposed surface of the coated fiber, is typically a relatively harder coating designed to provide a desired resistance to physical handling forces, such as those encountered when the fiber is cabled.

Inner primary radiation-curable compositions typically comprise a radiation-curable oligomer and a reactive diluent. The oligomer has a relatively high molecular weight, which allows for a certain integrity and toughness of the composition when cured, but which also, in conventional compositions, raises the viscosity of the compositions to a level that is unacceptable in fiber coating processes. Accordingly, substantial amounts of reactive diluent are added to bring the viscosity down to acceptable levels.

However, a drawback of reactive diluents is that they can increase the glass transition temperature of inner primary coatings, often resulting in an undesirable increase of the tensile modulus, in particular at low temperatures. This increase in modulus can result in attenuation of the signal transmission capability of the optical fiber.

A further drawback of the relatively low molecular weight reactive diluents is the release of volatile components during coating processes. Accordingly, it is an object of the present invention to provide a radiation-curable composition comprising a low amount of reactive diluents while still exhibiting a sufficiently low viscosity for coating applications.

Another aspect of the invention is providing a radiation curable composition comprising a low amount of reactive diluents and exhibiting, after cure, a low glass transition temperature.

SUMMARY OF THE INVENTION

The present invention provides radiation curable compositions comprising an oligomer and, relative to the total weight of the composition, less than 20 wt % monofunctional reactive diluents, while still exhibiting a viscosity of less than 10,000 cps at 25° C. and a secant modulus after cure of less than 5 MPa. The invention further provides articles, such as optical fibers, having a coating obtained by curing these compositions.

In addition, the present invention provides compositions comprising an oligomer and, relative to the total weight of the composition, less than 45 wt % reactive diluents, wherein at least 50 mole % of the diisocyanates used to prepare the oligomer are absent of a ring structure, and wherein the composition has a viscosity of less than 10,000 cps at 25° C.

DETAILED DESCRIPTION OF PREFERRED EMBODIMENTS

"Aliphatic" refers in this application to being exclusive of an aromatic ring.

"Reactive diluent" refers in this application to radiation-curable compounds having a molecular weight below 1,500 g/mol.

"Silicone oligomer" refers in this application to a compound comprising silicon atoms and having a molecular weight of more than 1,500 g/mol.

(A) Oligomers

Compositions according to the present invention comprise a radiation curable oligomer. The compositions of the present invention may comprise any suitable amount of oligomer, such as, for instance, 40 wt. % to 99 wt. %, and typically the amount of oligomer in the compositions is at least 50 wt %, preferably at least 65 wt %, more preferably at least 75 wt %, and most preferably at least 85 wt %, all said weight percentages being relative to the total weight of the composition. If more than one oligomer is present, then the wt. % of each oligomer is added.

Radiation-curable oligomers can comprise one or more radiation-curable end groups and an oligomer backbone. The end-group provides a cure mechanism, whereas the backbone provides suitable mechanical properties upon cure. In addition, the oligomer can comprise one or more linking groups such as a urethane- or urea-containing moiety which further can improve the mechanical performance of cured compositions. The linking groups can link an oligomeric backbone moiety to the radiation-curable end-group, or link oligomeric backbone moieties to themselves. Hence, for example, radiation-curable oligomers can be prepared from three basic components (backbone, linking, and radiation-curable components) and can be represented by structures such as, for example:

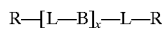

where R is a radiation-curable group, L is a linking group, and B is a backbone moiety. The variable x indicates the number of backbone moieties per oligomer molecule. This value X can be controlled by, for example, control of the reaction stoichiometry during oligomer synthesis. Typically, X is designed to be 1 or 2. In this representation, L and B are difunctional moieties, but oligomers can also be prepared from tri- and higher functional L and B moieties to provide branching.

In particular, typical radiation-curable urethane acrylate oligomers according to the present invention are prepared from (i) at least one ingredient which reacts to provide the radiation-curable acrylate group R, (ii) at least one ingredient which reacts to provide the urethane linking group L, and (iii) at least one ingredient which reacts to provide the backbone B. Different urethane acrylate oligomer synthetic strategies are disclosed in, for example, U.S. Pat. No. 5,093,386, which is hereby incorporated by reference. Other synthetic methods, however, may be used to prepare equivalent structures. These methods may be adapted by methods known in the art to provide urea linkages, methacrylate linkages, and other common types of linkages found in radiation-curable oligomers.

The radiation-curable oligomer can cure by reaction of its radiation-curable groups, R, via a free-radical mechanism or by cationic mechanism. A free-radical cure, however, is preferred. Ethylenically unsaturated groups are preferred. Exemplary radiation-curable groups include (meth)acrylate, vinyl ether, vinyl, acrylamide, maleate, fumarate, and the like. The radiation-curable vinyl group can participate in thiol-ene or amine-ene cure. Most preferably, the radiation-curable group is an acrylate if fast cure speed is desired.

Preferably, the oligomer comprises at least two radiation-curable groups, and preferably, at least two ethylenically unsaturated groups. The oligomer, for example, can comprise two, three, or four radiation-curable groups which are all preferably ethylenically unsaturated groups. There is no strict upper limit on the number of radiation-curable groups per oligomer, but in general, the number of radiation-curable groups is less than 10, and preferably, less than 8.

The oligomer can comprise copolymeric structures including random and block copolymeric structures. Methods known in the art can be used to prepare such copolymeric structures. For example, backbone moieties can be copolymeric. Also, a one-pot synthesis of multiple oligomers can be executed with use of multiple backbone moieties. Using multiple backbone moieties can yield at least some block copolymeric oligomers in the pre-polymer system. Formulation design of copolymeric oligomers can result in a better balance of properties and provide synergistic effects, which usually is crucial for fiber optic materials. In addition, oligomer blends or mixtures can be used to balance properties and provide synergistic effects.

For processing reasons, it is important to control the oligomer system's viscosity and flow behavior. For practical reasons, oligomers should be easy to remove from the reactors and flasks in which they are synthesized. If viscosity is too high, it will be difficult to process the oligomer system during formulation, even with some monomer diluent present.

If an oligomeric polyether diol is used, the polyether may include, for example, substantially non-crystalline polyethers. The oligomer may include polyethers comprising repeating units of one or more of the following monomer units:

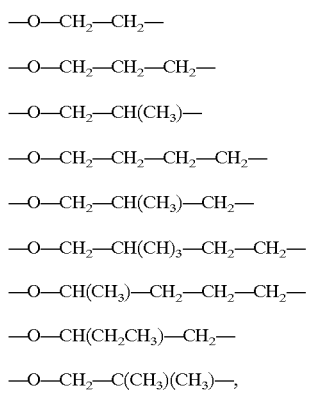

—O—CH$_2$—CH$_2$—

—O—CH$_2$—CH$_2$—CH$_2$—

—O—CH$_2$—CH(CH$_3$)—

—O—CH$_2$—CH$_2$—CH$_2$—CH$_2$—

—O—CH$_2$—CH(CH$_3$)—CH$_2$—

—O—CH$_2$—CH(CH)$_3$—CH$_2$—CH$_2$—

—O—CH(CH$_3$)—CH$_2$—CH$_2$—CH$_2$—

—O—CH(CH$_2$CH$_3$)—CH$_2$—

—O—CH$_2$—C(CH$_3$)(CH$_3$)—, and the like.

An example of a polyether polyol that can be used is the polymerization product of (i) tetrahydrofuran, or (ii) a mixture of 20 percent by weight of 3-methyltetrahydrofuran and 80 percent by weight of tetrahydrofuran, both of which have undergone a ring opening polymerization. This latter polyether copolymer contains both branched and non-branched oxyalkylene repeating units and is marketed as PTGL 1000 (Hodogaya Chemical Company of Japan). Another example of a polyether in this series which can be used is PTGL 2000 (Hodogaya Chemical Company). Butyleneoxy repeat units are preferred to impart flexibility to one oligomer in particular and the pre-polymer system in general. Particularly preferred are ethyleneoxy-butyleneoxy (EOBO) copolymers because they tend to have a relatively low viscosity compared to other polymers of comparable molecular weight.

If a polyolefin diol is used, the polyolefin is preferably a linear or branched hydrocarbon containing a plurality of hydroxyl end groups. Fully saturated, for example, hydrogenated hydrocarbons, are preferred because the long term stability of the cured coating increases as the degree of unsaturation decreases. Examples of hydrocarbon diols include, for example, hydroxyl-terminated, fully or partially hydrogenated 1,2-polybutadiene; 1,4- and 1,2-polybutadiene copolymers, 1,2-polybutadiene-ethylene or -propylene copolymers, polyisobutylene polyol; mixtures thereof, and the like.

Other suitable oligomers include, for instance, polyester oligomers, polycarbonate oligomers, acrylic oligomers, mixtures of any of the aforementioned oligomer types and the like. Preferably the oligomers used in the present invention are not silicone oligomers, and when a silicone oligomer is nevertheless used it is always in conjunction with at least one non-silicone oligomer present in a higher amount than said silicone oligomer. Preferably the present compositions comprise, relative to the total weight of the composition, less than 10 wt % of silicone oligomer, more preferably less than 5 wt %, and most preferably 0 wt %.

The linking group of the oligomer can be any suitable group, such as a urethane or urea group, and preferably is a urethane group. It is well-known in the art that urethane linkages can be formed by reaction of a polyfunctional isocyanate with a hydroxy compound including a hydroxy-containing backbone component or a hydroxy-containing radiation-curable component.

Polyfunctional isocyanates include diisocyanates, triisocyanates, and higher order polyisocyanates which can provide the linking group. As known in the art, isocyanate compounds can be trimerized to form isocyanurate compounds which can provide the linking group. Hence, polyisocyanate compounds can be oligomerized or polymerized to form higher order polyisocyanates comprising isocyanurate group. In the preparation of an oligomer, it is preferred that at least 50 mole % of the diisocyanates used are exclusive of a ring structure, preferably at least 65 mole %, more preferably at least 75 mole %, and most preferably 100 mole % of the diisocyanates used are non-cyclic. The absence of a cyclic structure can aid in increasing cure speed, lowering viscosity, and/or lowering the glass transition temperature. Examples of non-cyclic diisocyanates include, for instance, tetramethylene diisocyanate, 2,2,4 trimethyl-1,6-diisocyanate-hexane, and hexamethylene diisocyanate. Examples of cyclic diisocyanates include, for instance, toluenediisocyanate (TDI), isophoronediisocyanate (IPDI), diphenylmethane diisocyanate, hydrogenated diphenylmethane diisocyanate, and methylenebis(4-cyclohexylisocyanate).

Generally, the compound providing a radiation-curable terminus to the oligomer contains a functional group which can polymerize under the influence of actinic radiation and a functional group which can react with the diisocyanate.

Hydroxy functional ethylenically unsaturated monomers are preferred. More preferably, the hydroxy functional ethylenically unsaturated monomer contains acrylate, methacrylate, vinyl ether, maleate or fumarate functionality.

In the reaction between hydroxy group of the compound providing the terminus and isocyanate groups of compound providing the linking sites, it is preferred to employ a stoichiometric balance between hydroxy and isocyanate functionality and to preferably maintain the reaction temperature of at least 25° C. The hydroxy functionality should be substantially consumed. The hydroxy functional ethylenically unsaturated monomer attaches to the isocyanate via a urethane linkage. Monomers having (meth)acrylate functional groups include, for example, hydroxy functional (meth)acrylates such as 2-hydroxyethyl acrylate, 2-hydroxypropyl acrylate, caprolactone acrylate (e.g. SR495 from Sartomer), methacrylate analogs, and the like. Monomers having vinyl ether functional groups include, for example, 4-hydroxybutyl vinyl ether, and triethylene glycol monovinyl ether. Monomers having maleate functional groups include, for example, maleic acid and hydroxy functional maleates.

There is no particular limitation on the molecular weight of the oligomer, but the number average molecular weight of the oligomer in general can be less than about 25,000 g/mol, and preferably, less than about 10,000 g/mol, and more preferably, less than about 7,000 g/mol. The molecular weight is greater than 1,500 g/mol, preferably greater than 2,000 g/mol, more preferably greater than 3,000 g/mol, and most preferably the molecular weight is 3,000–6,000 g/mol.

(B) Reactive Diluents

Although the amount is preferably kept low, the composition may comprise reactive diluents. Preferably the composition comprises less than 25 wt %, relative to the total weight of the composition, more preferably less than 10 wt %, even more preferably less than 5 wt %, and most preferably about 0 wt % of monofunctional diluents. The composition generally comprises less than 45 wt %, relative to the total weight of the composition, of monofunctional and polyfunctional diluents combined, preferably less than 20 wt %, more preferably less than 10 wt %, even more preferably less than 5 wt %, and most preferably less than 2.5 wt %.

The radiation-curable functional group present on the reactive diluent may be of the same nature as that used in the radiation-curable oligomer. Preferably, the radiation-curable functional group present in the reactive diluent is capable of copolymerizing with the radiation-curable functional group present on the radiation-curable oligomer. Ethylenic unsaturation is preferred. In particular, acrylate unsaturation is preferred.

The reactive diluent system may comprise a monofunctional monomer having an acrylate or vinyl ether functionality and an $C_4$–$C_{20}$ alkyl or polyether moiety. Examples of such reactive diluents include hexylacrylate, 2-ethylhexylacrylate, isobornylacrylate, decylacrylate, laurylacrylate, stearylacrylate, ethoxyethoxy-ethylacrylate, laurylvinylether, 2-ethylhexylvinyl ether, N-vinyl formamide, isodecyl acrylate, isooctyl acrylate, vinyl-caprolactam, N-vinylpyrrolidone and the like.

Another type of monofunctional reactive diluents are monofunctional compound comprising an aromatic group. Examples of monofunctional diluents having an aromatic group include:
ethyleneglycolphenyletheracrylate,
polyethyleneglycolphenyletheracrylate,
polypropyleneglycolphenyletheracrylate, and
alkyl-substituted phenyl derivatives of the above monomers, such as
polyethyleneglycolnonylphenyletheracrylate.

If monofunctional reactive diluents are present, preferably at least 50 wt %, relative to the total weight of monofunctional reactive diluents, more preferably at least 75 wt %, and most preferably 100 wt % of the monofunctional reactive diluents is absent an aromatic ring.

Furthermore, a reactive diluent may be polyfunctional, for instance it may contain two groups capable of polymerization using actinic radiation. A diluent having three or more of such reactive groups can be present as well. Examples of such monomers include:
$C_2$–$C_{18}$ hydrocarbondioldiacrylates,
$C_4$–$C_{18}$ hydrocarbondivinylethers,
$C_3$–$C_{18}$ hydrocarbontrioltriacrylates,
    the polyether analogs thereof, and
    the like, such as
1,6-hexanedioldiacrylate,
trimethylolpropanetriacrylate,
hexanedioldivinylether,
triethyleneglycoldiacrylate,
pentaeritritoltriacrylate,
tripropyleneglycol diacrylate, and
alkoxylated bisphenol A diacrylate.

Particularly preferred diluents, when used, are alkoxylated diluents that are exclusive of an aromatic ring, such as ethoxylated or propoxylated lauryl acrylate and isodecyl acrylate. An advantage of alkoxylated aliphatic diluents is that they can increase the cure speed of the radiation-curable composition.

(C) Photoinitiators

The composition may optionally further comprise at least one photoinitiator. Photoinitiators are generally required for a fast UV cure but may be omitted for electron beam cure. Conventional photoinitiators can be used. Examples include benzophenones, acetophenone derivatives, such as alpha-hydroxyalkylphenylketones, benzoin alkyl ethers and benzil ketals, monoacylphosphine oxides, and bisacylphosphine oxides. A preferred photoinitiator is 1-hydroxycyclohexylphenylketone (Irgacure 184, Ciba Geigy).

Often mixtures of photoinitiators provide a suitable balance of properties. The amount of photoinitiator system is not particularly limited but will be effective to provide fast cure speed, reasonable cost, good surface and through cure, and lack of yellowing upon aging. Typical amounts can be, for example, about 0.3 wt. % to about 10 wt. %, preferably about 1 wt. % to about 6 wt. %.

(D) Additives

The composition may further comprise additives, such as, for instance, UV absorbers, chain transfer agents, inorganic fillers, antioxidants (e.g. Irganox 1035 available from Ciba Geigy), or silane adhesion promoters, e.g. mercapto functional silane adhesion promoters such as gamma-mercaptopropyltrimethoxy silane.

(E) Properties

The viscosity of the composition is preferably less than 10,000 cps at 25° C., more preferably less than 7,000 cps, and most preferably less than 6,000 cps. It is further preferred that the composition has a viscosity of less than 3,000 cps, preferably 1,000–3,000 cps, in at least part of the range 40° C.–60° C. Preferably the composition has a viscosity of less than 3,000 cps, preferably 1,000–3,000 cps, in the entire range of 40° C.–60° C.

The composition, after radiation cure, preferably has an elongation at break of at least 75%, more preferably at least 100%, most preferably about 100–200%. The secant modulus of the composition, after cure, is preferably less than 5 MPa, more preferably less than 3 MPa, even more preferably less than 1.5 MPa, and most preferably about 0.1–1.3 MPa. The glass transition temperature of the composition, after cure, is preferably less than −20° C., preferably less than −30° C., more preferably less than −40° C., and most preferably less than −50° C.

The cure speed of the present compositions, defined as the UV dose required to reach 95% of the maximum attainable modulus of a 75 μm thick layer of the composition generally will be less than 0.7 J/cm$^2$, is preferably less than 0.35 J/cm$^2$, more preferably less than 0.25 J/cm$^2$, and most preferably less than 0.15 J5cm$^2$.

The compositions of the present invention are useful in a wide variety of applications, such as in coating applications. The compositions are, for example, useful as coatings for optical fibers, e.g. as inner primary coatings.

EXAMPLES

The following examples are given as particular embodiments of the invention and to demonstrate the practice and advantages thereof. It is to be understood that the examples are given by way of illustration and are not intended to limit the specification or the claims that follow in any manner.

Three composition (indicated as Example I, II, and III) were prepared with the ingredients listed in Table I. The amounts of the ingredients listed in Table I are in weight percentage relative to the total weight of the composition.

TABLE 1

| Ingredient | Example I | Example II | Example III |
| --- | --- | --- | --- |
| H-TMDI-PPG2000-TDI-PTGL2000-TMDI-H | 53.6 | — | — |
| H-TMDI-PPG2000-TDI-EOBO2000-TMDI-H | — | 69.00 | — |
| H-TMDI-EOBO4000-TMDI-H | — | — | 88.90 |
| Ethoxylated lauryl acrylate | 33.30 | 17.70 | — |
| Vinyl Caprolactam | 5.00 | 5.00 | 5.00 |
| Bisphenol A ethoxylated diacrylate | 2.10 | 2.20 | 0.10 |
| Tinuvin 622 | 0.10 | 0.10 | 0.10 |
| gamma-mercaptopropyl trimethoxysilane | 0.9 | 0.9 | 0.9 |
| Irgacure 1700 | 3.00 | 3.00 | 3.00 |
| Irgacure 184 | 2.00 | 2.00 | 2.00 |
| Test data: | | | |
| Viscosity (cps, 25° C.) | 4,900 | 5,300 | 6,000 |
| Glass transition temperature (° C.) | −40 | −53 | −61 |
| Secant Modulus (MPa) | 1.04 | 1.14 | 1.07 |
| Elongation (%) | 147 | 107 | 121 |
| Cure Speed (J/cm$^2$ required to reach 95% of maximum attainable modulus) | 0.28 | 0.19 | 0.08 |

H = Hydroxyethylacrylate residue;
TMDI = 2,2,4-trimethylene-1,6-diisocyanate-hexane residue;
TDI = Toluenediisocyanate residue;
PPG2000 = polypropylene glycol residue having a molecular weight of about 2,000;
PTGL2000 = polymethyltetrahydrofurfuryl-polytetrahydrofurfuryl copolymer diol residue having a molecular weight of about 2,000;
EOBO2000 = is an ethyleneoxide-butyleneoxide copolymer residue having a molecular weight of about 2,000;
EOBO4000 = is an ethyleneoxide-butyleneoxide copolymer residue having a molecular weight of about 4,000;
Irgacure 1700 = a photoinitiator available from Ciba Geigy;
Irgacure 184 = a photoinitiator available from Ciba Geigy;
Tinuvin 622 = UV absorber Four further compositions (indicated as Examples IV–VII) were prepared with the ingredients listed in Tables II and III. The amounts of the ingredients listed in Tables II and III are in weight percentage relative to the total weight of the composition. Results are also given in these tables.

TABLE II

| Ingredient | Example IV | Example V |
| --- | --- | --- |
| H-TMDI-Acclaim4200-TMDI-H | 88.9 | — |
| H-TMDI-EOBO4000-TMDI-H | — | 91.0 |
| Vinyl Caprolactam | 5.0 | — |
| Bisphenol A ethoxylated diacrylate (SR349D from Sartomer) | 0.1 | — |
| Hexane Diol Diacrylate | — | 3.0 |
| Irgacure 1700 | 3.0 | 3.0 |
| Irgacure 184 | 2.0 | 2.0 |
| Gamma-mercaptopropyl trimethoxysilane | 0.9 | 0.9 |
| Tinuvin 622 LD | 0.1 | 0.1 |

TABLE II-continued

| Ingredient | Example IV | Example V |
|---|---|---|
| Test data: | | |
| Viscosity (cps, 25° C.) | 6,792 | 6,387 |
| Glass transition temperature (° C.) | −57 | −62 |
| Secant Modulus (MPa) | 1.557 | 1.091 |
| Elongation (%) | 78.6 | 93.6 |
| Cure speed (J/cm²) | 0.11 | 0.23 |

Acclaim 4200 = a polypropylene glycol residue having a molecular weight of about 4200.

TABLE III

| Ingredient | Example VI | Example VII |
|---|---|---|
| H-I-EOBO4000-I-H | 92.5 | — |
| H-TMDI-Acclaim4200-TMDI-H | — | 92.5 |
| Isodecyl Acrylate | 5.0 | 5.0 |
| Chivacure TPO | 1.0 | 1.0 |
| Chivacure 184 | 0.5 | 0.5 |
| Gamma-mercaptopropyl trimethoxysilane | 0.9 | 0.9 |
| Tinuvin 622 LD | 0.1 | 0.1 |
| Test data: | | |
| Viscosity (cps, 25° C.) | 8,263 | 6,500 |
| Glass transition temperature (° C.) | <−50° C. | <−60° C. |
| Secant Modulus (MPa) | 1.306 | 1.08 |
| Elongation (%) | 73.1 | 94.6 |
| Cure speed (J/cm²) | 0.68 | 0.36 |

Chivacure TPO = photoinitiator
Chivacure 184 = photoinitiator

Test Methods
Viscosity Test Method

The viscosity was measured using a Physica MC10 Viscometer. The test samples were examined and if an excessive amount of bubbles was present, steps were taken to remove most of the bubbles. Not all bubbles need to be removed at this stage, because the act of sample loading introduces some bubbles.

The instrument was set up for the conventional Z3 system, which was used. The samples were loaded into a disposable aluminum cup by using the syringe to measure out 17 cc. The sample in the cup was examined and if it contains an excessive amount of bubbles, they were removed by a direct means such as centrifugation, or enough time was allowed to elapse to let the bubbles escape from the bulk of the liquid. Bubbles at the top surface of the liquid are acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which will produce the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If not, it is possible that the temperature had not yet reached an equilibrium value, or that the material was changing due to shearing. If the latter case, further testing at different shear rates will be needed to define the sample's viscous properties. The results reported are the average viscosity values of three test samples.

Tensile Strength, Elongation and Modulus Test Method

The tensile strength, elongation and secant modulus of cured samples was tested using a universal testing instrument, Instron Model 4201 equipped with a personal computer and software "Series IX Materials Testing System." The load cells used were 2 and 20 pound capacity. The ASTM D638M was followed, with the following modifications.

A drawdown of each material to be tested was made on glass plate or Mylar (in particular, the outer primary coating compositions, unless otherwise noted, were measured on Mylar) and cured using a UV processor. The cured film was conditioned at 22 to 24° C. and 50±5% relative humidity for a minimum of sixteen hours prior to testing.

A minimum of eight test specimens, having a width of 0.5+0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton-tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The appropriate load cell was determined by using the following equation:

$$[A \times 145] \times 0.0015 = C$$

Where:
 A=Product's maximum expected tensile strength (MPa);
 145=Conversion Factor from MPa to psi;
 0.00015=approximate cross-sectional area (in²) of test specimens; and
 C=lbs.

The 2 pound load cell was used for materials where C=1.8 lbs. The 20 pound load cell was used for materials where 1.8<C<18 lbs. If C>19, a higher capacity load cell was required.

The crosshead speed was set to 1.00 inch/min (25.4 mm/min), and the crosshead action was set to "return at break". The crosshead was adjusted to 2.00 inches (50.8 mm) jaw separation. The air pressure for the pneumatic grips was turned on and adjusted as follows: set approximately 20 psi (1.5 Kg/cm²) for primary optical fiber coatings and other very soft coatings; set approximately 40 psi (3 Kg/cm²) for optical fiber single coats; and set approximately 60 psi (4.5 Kg/cm²) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were only analyzed if the temperature was within the range 23±1.0° C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and secant modulus were checked to determine whether any one of them deviated from the average enough to be an "outlier." If the modulus value was an outlier, it was discarded. If there were less than six data values for the tensile strength, then the entire data set was discarded and repeated using a new plate.

Dynamic Mechanical Testing

The elastic modulus (E'), the viscous modulus (E"), and the tan delta (E"/E'), which is an indication of the material's $T_g$, of the examples were measured using a Rheometrics Solids Analyzer (RSA-11), equipped with: 1) a personal computer having MS-DOS 5.0 operating system and having Rhios® software (Version 4.2.2 or later) loaded, and 2) a liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −80° C. and increasing the temperature at about 1/minute until the temperature reached about 60° C. to about 70° C. The test frequency used was 1.0 radian/second.

Having described specific embodiments of the present invention, it will be understood that many modifications thereof will readily be apparent to those skilled in the art, and it is intended therefore that this invention is limited only by the spirit and scope of the following claims.

What is claimed is:

1. A radiation curable composition comprising:
   (i) at least one radiation-curable oligomer, said oligomer including diisocyanate residues, wherein at least 50 mole % of the diisocyanates used to form the oligomer is absent a cyclic structure; and
   (ii) 0–10 wt %, relative to the total weight of the composition, of monofunctional reactive diluents, wherein at least 50 wt % of said monofunctional reactive diluents is absent an aromatic ring;
   wherein said composition has a viscosity of less than 10,000 cps at 25° C.; and, after cure, a secant modulus of less than 5 MPa.

2. The composition of claim 1, wherein said composition comprises less than 5 wt % of said monofunctional reactive diluents.

3. The composition according to claim 1, wherein said composition has a viscosity of less than 3,000 cps in at least part of the range 40° C.–60° C.

4. The composition according to claim 1, wherein a coating obtained by curing said composition has a glass transition temperature of less than −30° C.

5. The composition according to claim 1, wherein said composition comprises less than 5 wt %, relative to the total weight of the composition, of silicone oligomers.

6. The composition according to claim 1, wherein said composition is absent any silicone oligomers.

7. The composition according to claim 1, comprising an alkoxylated aliphatic diluent.

8. The composition according to claim 1, comprising a silane adhesion promoter.

9. The composition according to claim 1, wherein said composition, after cure, has a secant modulus of less than 1.5 MPa.

10. A radiation-curable composition comprising:
    (i) a radiation-curable oligomer;
    (ii) 0–45 wt % of one or more reactive diluents, wherein if said one or more reactive diluents include monofunctional diluents then at least 50 wt % of said monofunctional reactive diluents is absent an aromatic ring;
    wherein said oligomer comprises diisocyanate residues; at least 50 mole % of the diisocyanates used to form said oligomer is absent a cyclic structure; and said composition has a viscosity of less than 10,000 cps at 25° C., and wherein said composition comprises less than 10 wt % of monofunctional reactive diluents.

11. The composition of claim 10, wherein at least 65 mole % of the diisocyanates used to form said oligomer is absent a cyclic structure.

12. The composition according to claim 10, wherein said composition, after cure, has a secant modulus of less than 5 MPa.

13. The composition according to claim 10, wherein said composition has a viscosity of less than 3,000 cps in at least part of the temperature range 40° C.–60° C.

14. A coated optical fiber comprising a coating obtained by curing the composition according to claim 1.

15. A radiation curable composition comprising
    (i) at least 85 wt % of a urethane (meth)acrylate oligomer; and
    (ii) monofunctional reactive diluent, wherein at least 50 wt % of said monofunctional reactive diluent is absent an aromatic ring; and wherein said composition has a viscosity of less than 10,000 cps at 25° C.

16. The radiation curable composition of claim 1, wherein said composition has a cure speed of less than 0.7 J/cm².

17. The radiation curable composition of claim 10, wherein said composition has a cure speed of less than 0.7 J/cm².

18. The radiation curable composition of claim 15, wherein said composition has a cure speed of less than 0.7 J/cm².

19. A radiation curable composition comprising:
  (i) at least one radiation-curable oligomer, said oligomer having ethylene oxide and butylene oxide moieties and diisocyanate residues, wherein at least 50 mole % of the diisocyanates used to form the oligomer is absent a cyclic structure; and
  (ii) 0–20 wt %, relative to the total weight of the composition, of monofunctional reactive diluents, wherein at least 50 wt % of said monofunctional reactive diluents is absent an aromatic ring;

wherein said composition has a viscosity of less than 10,000 cps at 25° C.; and, after cure, a secant modulus of less than 5 MPa.

* * * * *